United States Patent
Bowers

(10) Patent No.: US 11,031,759 B2
(45) Date of Patent: Jun. 8, 2021

(54) HIGH JACK SUPPORT ASSEMBLY

(71) Applicant: THE BOWERS GROUP, LLC, Des Moines, IA (US)

(72) Inventor: Joshua Bowers, Des Moines, IA (US)

(73) Assignee: The Bowers Group, LLC, Des Moines, IA (US)

( * ) Notice: Subject to any disclaimer, the term of this patent is extended or adjusted under 35 U.S.C. 154(b) by 0 days.

(21) Appl. No.: 16/420,348

(22) Filed: May 23, 2019

(65) Prior Publication Data
US 2020/0373746 A1    Nov. 26, 2020

(51) Int. Cl.
| | |
|---|---|
| *H02G 3/04* | (2006.01) |
| *F16L 3/02* | (2006.01) |
| *F16L 3/06* | (2006.01) |
| *F16L 3/08* | (2006.01) |
| *H02G 3/32* | (2006.01) |
| *F16L 3/12* | (2006.01) |
| *H02G 3/34* | (2006.01) |
| *F16L 3/13* | (2006.01) |

(52) U.S. Cl.
CPC ............. *H02G 3/0481* (2013.01); *F16L 3/02* (2013.01); *F16L 3/06* (2013.01); *F16L 3/08* (2013.01); *F16L 3/12* (2013.01); *F16L 3/13* (2013.01); *H02G 3/32* (2013.01); *H02G 3/34* (2013.01)

(58) Field of Classification Search
CPC ...... H02G 3/0481; H02G 3/34; H02G 3/0683; H02G 3/32; F16L 3/02; F16L 3/01; F16L 3/12; F16L 3/1226; F16L 3/06; F16L 3/08; F16L 3/13
See application file for complete search history.

(56) References Cited

U.S. PATENT DOCUMENTS

| | | | | |
|---|---|---|---|---|
| 2,144,272 A * | 1/1939 | Ray | ..................... | H02G 11/003 248/51 |
| 3,714,385 A * | 1/1973 | Leverich | ................ | H01R 24/46 200/51.1 |
| 4,424,555 A * | 1/1984 | Krubsack | ................ | F21S 8/086 248/419 |
| 4,462,065 A * | 7/1984 | Rhodes | ................... | F21V 21/02 362/123 |
| 4,609,242 A * | 9/1986 | Kemppainen | .......... | H01R 24/50 29/882 |
| 4,628,159 A * | 12/1986 | Deitch | ................... | H01R 24/46 200/504 |
| 5,398,895 A * | 3/1995 | Whetherhult | ............. | F16L 3/00 248/160 |
| 5,567,043 A * | 10/1996 | Swanson | ................... | F21S 2/00 362/249.01 |
| 5,824,960 A * | 10/1998 | Markling | ................. | B60D 1/62 174/135 |
| D624,454 S * | 9/2010 | Kertz | ........................... | D11/145 |
| D824,571 S * | 7/2018 | Sonneman | ..................... | D26/87 |
| 10,427,627 B2 * | 10/2019 | Fukazu | .................. | B60L 50/66 |
| 2012/0076606 A1 * | 3/2012 | Buxton | .................... | B60P 7/12 410/50 |

(Continued)

*Primary Examiner* — Tan Le
(74) *Attorney, Agent, or Firm* — Zarley Law Firm, P.L.C.

(57) ABSTRACT

A high jack support assembly has an elongated hollow conduit having a first end and a second end. A cord and/or tube extends through the conduit from the first end to the second end. One or more connecting members are attached to the conduit and are used to attach the conduit to a support and hold the conduit in an upright position.

16 Claims, 4 Drawing Sheets

(56) References Cited

U.S. PATENT DOCUMENTS

2016/0047494 A1* 2/2016 Dickinson .................. F16B 1/00
                                                          248/74.2
2017/0299235 A1* 10/2017 Hsu ......................... F25B 21/02

* cited by examiner

HIGH JACK SUPPORT ASSEMBLY

BACKGROUND OF THE INVENTION

The present invention is directed to a high jack support assembly and more particularly a jack assembly that positions a power connection above a work area.

Use of tools requiring an electrical or pneumatic connection are well known in the art. Typically a tool such as a tattoo machine or iron, has an electrical cord connected to a power source such as an electric socket. Due to the placement of the socket, the electrical cords lay on the ground. These cords can create an obstacle and/or a hazard as individuals can trip on the cord. In addition, when using more than one tool, cords can become tangled. As a result, a need exists in the art for a device that addresses these deficiencies.

An objective of the present invention is to provide a high jack support assembly that positions a power connection above a work area.

Another objective of the present invention is to provide a high jack support assembly that produces a less cluttered and more safe work area.

A still further objective of the present invention is to provide a high jack support assembly that provides a hygienic work place where cords are kept off a dirty ground surface.

These and other objectives will be apparent to one having ordinary skill in the art based upon the following written description, drawings, and claims.

SUMMARY OF THE INVENTION

A high jack support assembly includes a hollow conduit having a first end and a second end. An electrical cord and/or pneumatic tube is inserted within the first end and extends to the second end where the cord or tube is attached to at least one or more electrical connectors.

The cord and/or tube are connected to a power supply which is connected to a power source. One or more connecting members are attached to the hollow conduit and then attached to a support to hold the hollow conduit in a raised position.

Finally, an adapter for a tool is connected to the electrical connector.

DETAILED DESCRIPTION OF THE PREFERRED EMBODIMENT

Figure 1:
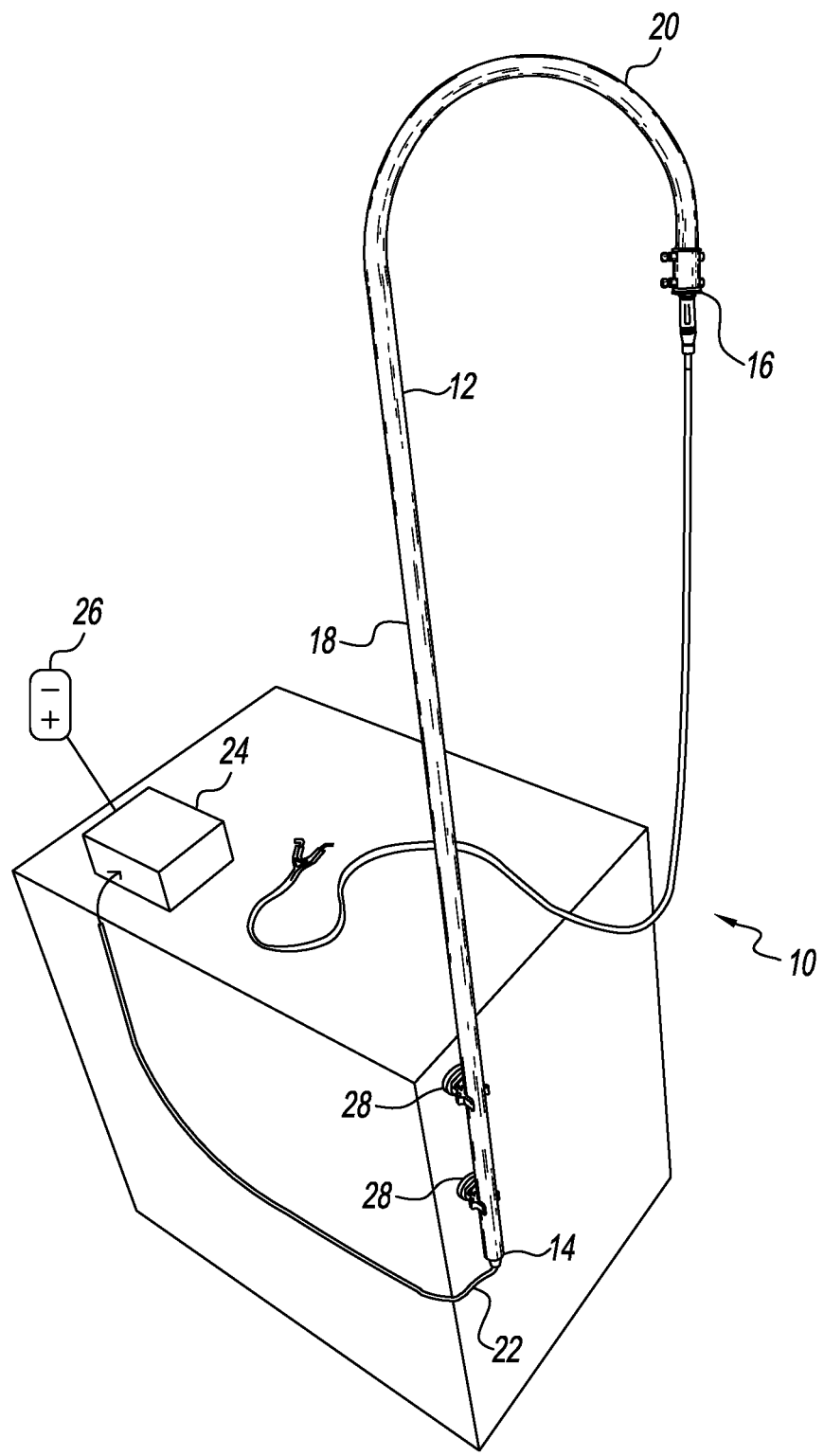
FIG. 1 is a perspective view of a high jack support assembly.
Figure 2:
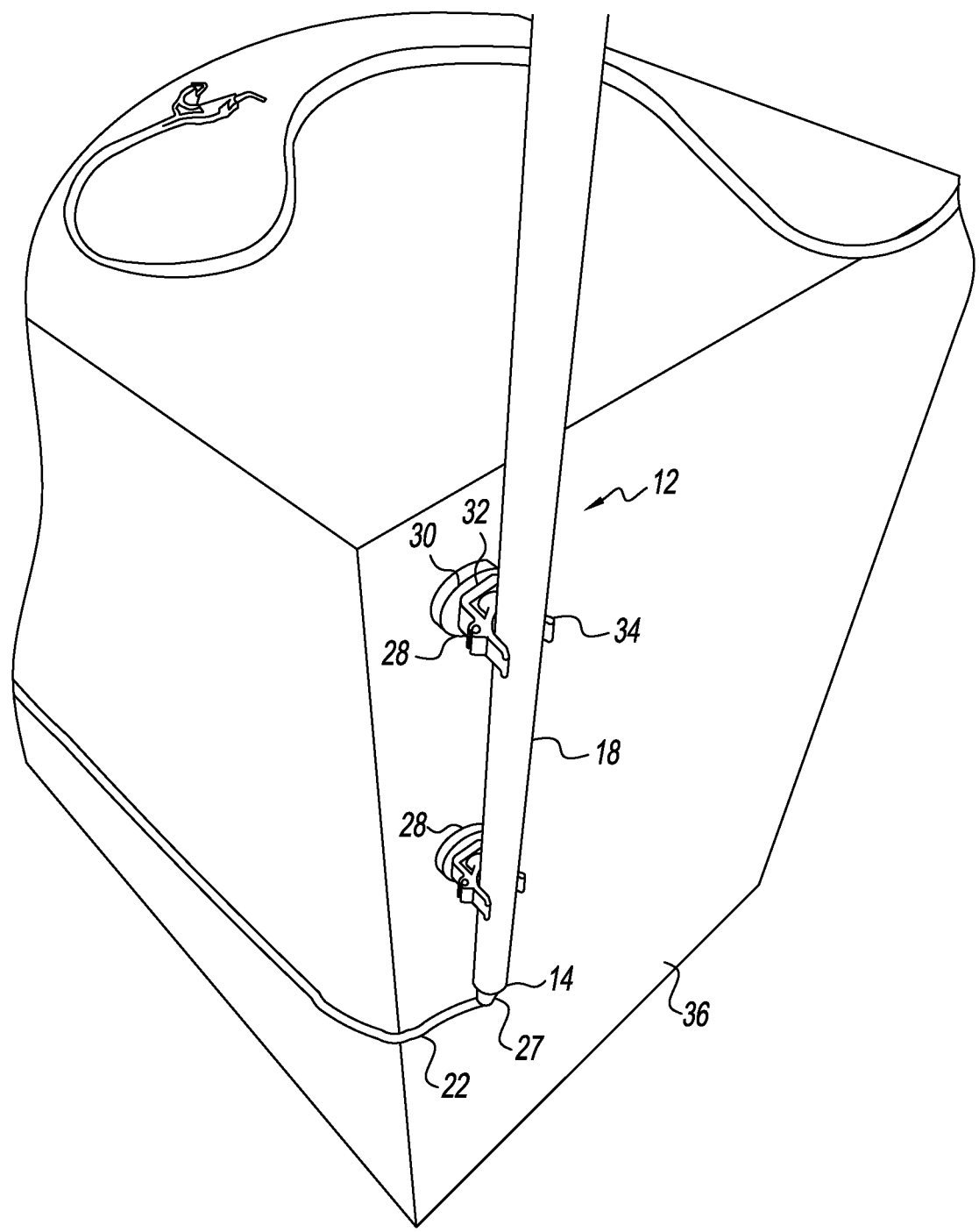
FIG. 2 is a partial perspective view of a high jack support assembly.
Figure 3:
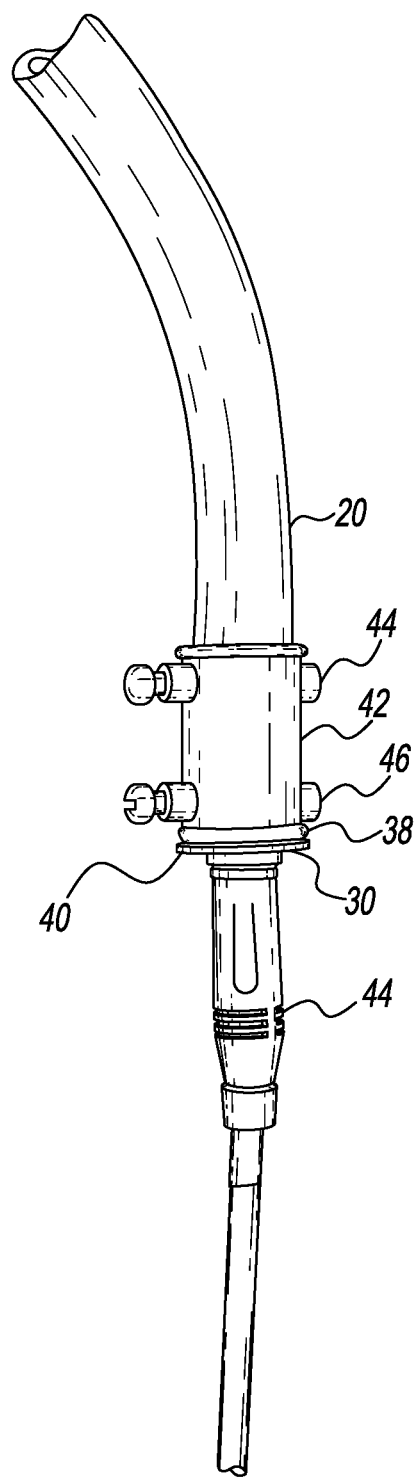
FIG. 3 is a partial perspective view of a high jack support assembly.
Figure 4:
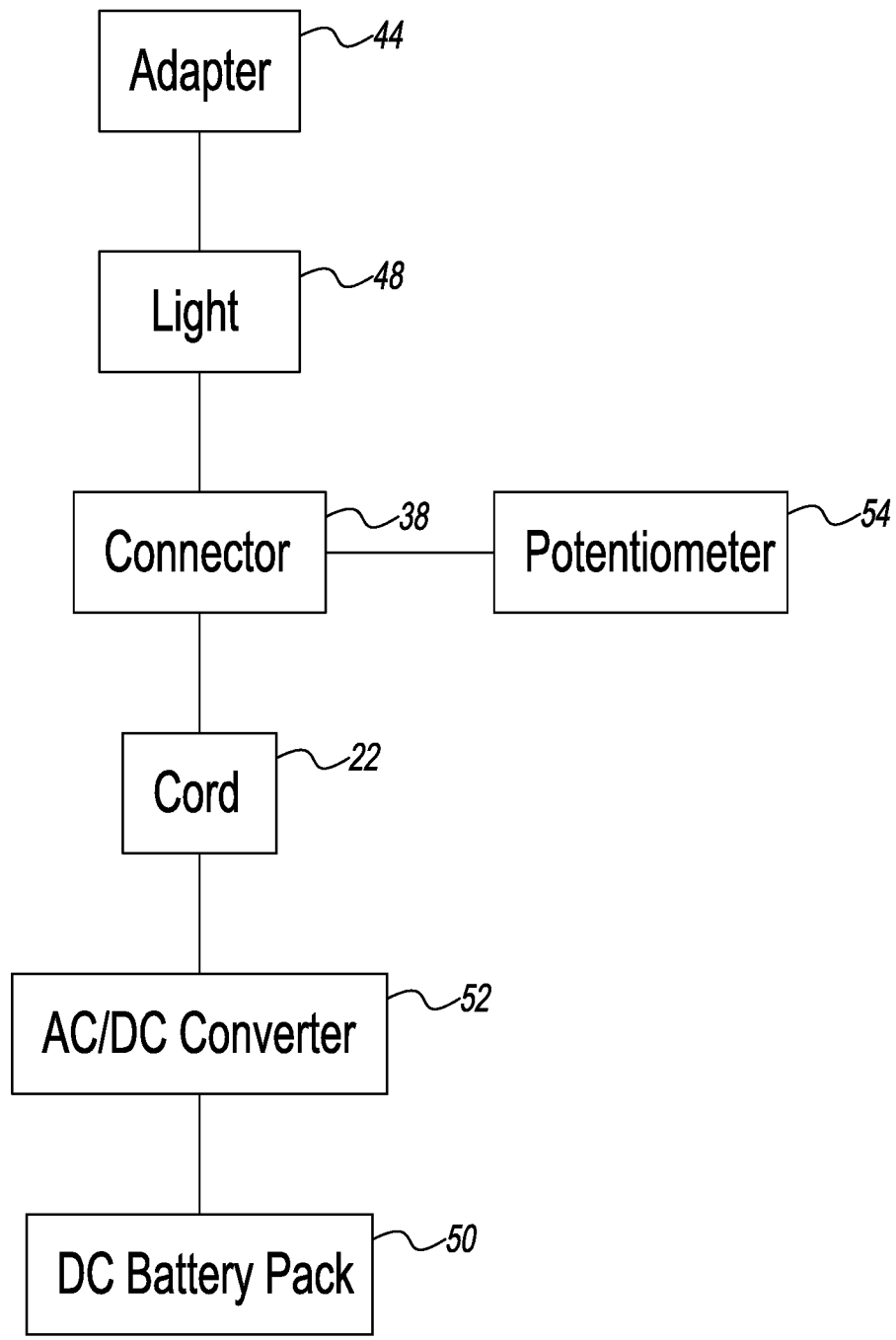
FIG. 4 is a schematic view of a high jack support assembly.

Referring to the Figures, a high jack support assembly 10 includes a hollow elongated conduit or tube 12 having a first end 14 and a second end 16. The high jack support assembly 10 can be used with any tool in a variety of applications for barbers, stylists, tattoo artists, cosmetic tattoo professionals, and the like. The conduit is of any size, shape, and structure and in the example shown the conduit 12 has a straight portion 18 extending from the first end 14 to a curved or arcuate portion 20 that extends to the second end 16.

Extending into the first end 14 and through the conduit 12 to the second end 16 is an electric cord and/or pneumatic tube 22. A first end 14 of the cord and/or tube 22 is connected to a power supply 24 and the power supply 24 is connected to a power source 26 such as an electrical outlet or source of pressurized air. Alternatively, the cord 22 is connected directly to the power source 26. A wire bladder 27 is used at the first end 14 of the conduit 12 to hold the wire/tube 22 in position.

At least one, and preferably more than one, connecting members 28 are attached to the conduit 12. The connecting members 28 are of any size, shape, or structure and can be attached anywhere along the conduit 12. In the example shown, the connecting member 28 has a magnet 30 attached to a mounting bracket 32 of a clip 34. The connecting members 28 are attached to a support 36 such as a work table, or the like, to hold the conduit 12 in an upright or vertical position.

At the second end 16 of the conduit 12 and connected to the cord/tube 22 is at least one or more electrical connectors 38. The electrical connector 38 is of any size, shape and structure. In the example shown, the connector 38 has a bushing 40 and a barrel jack 42 to receive an adapter 44. The adapter 44 is of any type such as a mono jack, 3.5 mm jack, or the like. The adapter 44 is connected to a tool (not shown) such as a tattoo machine or iron or any tool requiring pneumatic or electrical power. In some embodiments, switch(es) 46 and/or lights 48 are attached to the second end 16 and connector 38.

In operation, the conduit 12 is attached to a support 36 using the connecting members 28. The wire/tube 22 is connected to the power supply 24 and the power supply 24 connected to a power source 26. Finally, the adapter 44 is connected to jack 42. As a result, electrical cords and tubes 22 are removed from the ground and power is supplied from above.

In an alternative embodiment, the cord 22 is connected to a DC battery pack 50 connected to an AC/DC converter 52. Attached to the electrical connector 38 is a potentiometer 54 used to adjust voltage at output.

What is claimed is:

1. A high jack support assembly, comprising:
    a hollow elongated conduit having a straight portion that extends between a first end to a curved portion, and the curved portion extends between the straight portion and a second end;
    an electrical cord extending into the first end and through the hollow elongated conduit to the second end;
    a wire bladder at the first end;
    at least one electrical connector connected to the second end of the hollow elongated conduit and the second end of the electrical cord; and
    at least one connecting member attached to the hollow elongated conduit.

2. The assembly of claim 1 wherein a first end of the electric cord is connected to a power supply that is connected to a power source.

3. The assembly of claim 1 wherein the at least one connecting member has a magnet attached to a mounting bracket of a clip.

4. The assembly of claim 1 wherein the at least one electrical connector has a bushing and a barrel jack.

5. The assembly of claim 1 wherein connected to the at least one electrical connector is at least one switch and a light.

6. A high jack support assembly, comprising:
a hollow elongated conduit extending from a first end to a second end, wherein the hollow elongated tube has a curved portion;
a cord extending from a power supply into the first end and through the hollow elongated conduit and terminating at the second end;
the second end of the hollow elongated tube having an electrical connector that is connected to the cord; and
at least one connecting member attached to the hollow elongated conduit.

7. The assembly of claim 6 further comprising the electrical connector having a bushing and a barrel jack, wherein the barrel jack is configured to receive an adapter of a tool.

8. The assembly of claim 6 wherein the hollow elongated conduit has a straight portion extending from the first end to a curved portion that extends to the second end.

9. The assembly of claim 6 wherein the connecting member is attached to a work table.

10. The assembly of claim 6 wherein the cord is connected to a battery pack and a converter.

11. The assembly of claim 6 wherein the electrical connector is attached to a potentiometer.

12. The assembly of claim 6 further comprising the first end of the hollow elongated conduit having a wire bladder.

13. The assembly of claim 6 further comprising at least one light attached at the second end of the hollow elongated conduit.

14. The assembly of claim 6 further comprising the connecting member having a mounting bracket and a clip, wherein the clip receives the hollow elongated conduit and the mounting bracket has a magnet to attach the connecting member to a support.

15. A high jack support assembly, comprising:
a hollow elongated conduit having a straight portion that extends between a first end to a second end;
an electrical cord extending into the first end and through the hollow elongated conduit to the second end;
a wire bladder at the first end;
at least one electrical connector connected to the second end of the hollow elongated conduit and the second end of the electrical cord; and
at least one connecting member attached to the hollow elongated conduit.

16. The assembly of claim 15 wherein the at least one electrical connector has a bushing and a barrel jack.

* * * * *